May 23, 1961

E. D. WILKERSON 2,985,025

EDUCATIONAL DEVICE FOR DEMONSTRATING
COMPOUND MOVEMENT OF A SPHERE

Filed Nov. 19, 1958

INVENTOR
EDWARD D. WILKERSON

BY *Mason, Porter, Diller & Stewart*
ATTORNEYS

United States Patent Office 2,985,025
Patented May 23, 1961

2,985,025
EDUCATIONAL DEVICE FOR DEMONSTRATING COMPOUND MOVEMENT OF A SPHERE
Edward D. Wilkerson, 280 E. Northfield Road, Livingston, N.J.
Filed Nov. 19, 1958, Ser. No. 774,898
12 Claims. (Cl. 74—198)

This invention relates to an improved educational device for demonstrating compound rotation of a sphere about a selected or constantly reoriented axis of rotation.

The necessity for demonstration device of the character stated evolves from the difficulty encountered in orientation relative to a particular reference point on a sphere when describing relative movement of the sphere, as representing the earth in the universe, for example.

A primary object of the invention is to provide a support stand freely supporting a sphere at a plurality of spaced points, one of the points comprising power means for rotating the sphere about a constantly changing axis of rotation, or about a selected axis of rotation.

Another object of the invention is to provide a novel support stand for use with a sphere to impart movement of the sphere in a constantly changing path of movement.

A more specific object of this invention is to provide a support stand having two fixed bearing points and, at another point comprising a driving means, freely resting a sphere on the driving means in relation to said fixed points, the driving means including a friction wheel tangentially opposing the sphere and having an axis of rotation disposed generally radially with relation to the sphere.

A further object of the invention is to provide an arrangement of the character stated including means for driving the friction wheel, and means for tilting the axis thereof to present a selected point on the wheel periphery in driving contact with the sphere.

A still further object of the invention is to provide means for constantly changing the tilt of the friction wheel axis as the wheel is being driven, thereby to impart rotation to the sphere about an ever changing axis of rotation.

Figure 1:
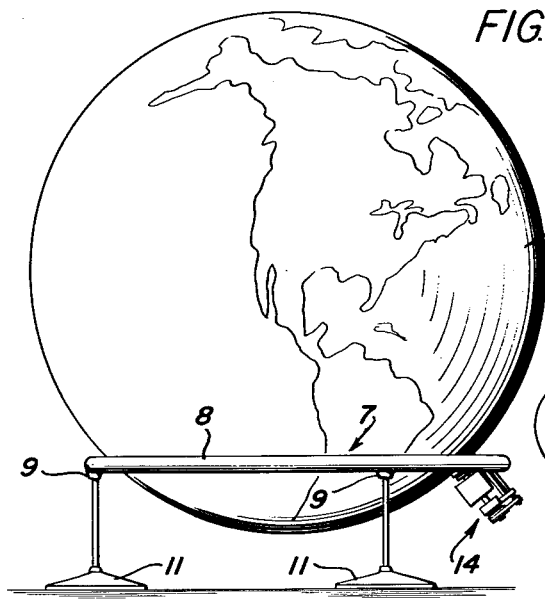
Figure 2:
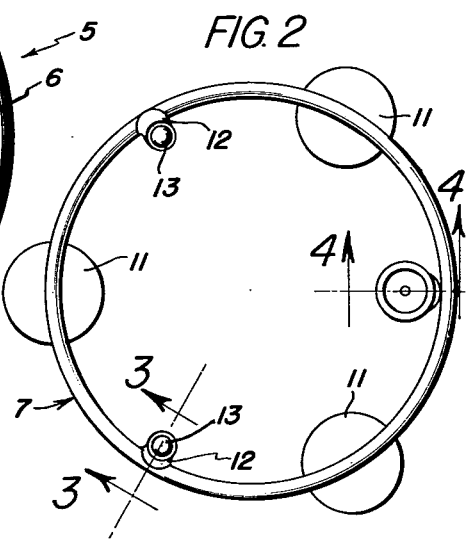
Figure 4:
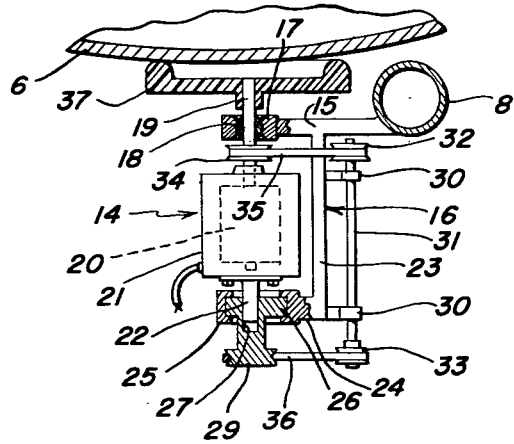
Figure 3:
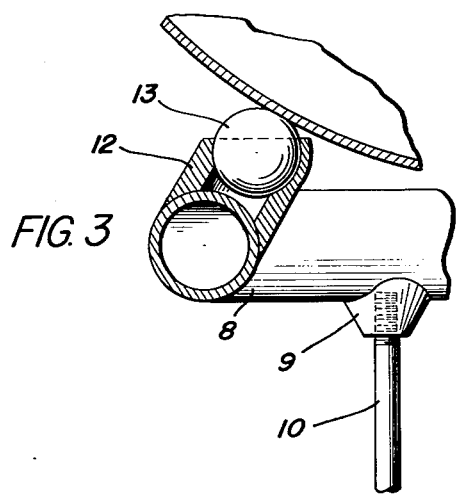
Figure 5:
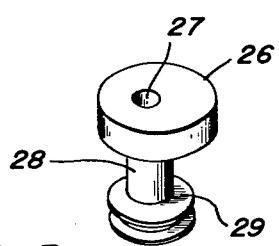

More particular objects of invention will become apparent from the reading of the following description of a preferred embodiment, the appended claims and the accompanying drawing, in which:

Figure 1 is an elevation of the novel apparatus;
Figure 2 is a top plan view of the novel support with the sphere removed therefrom;
Figure 3 is an enlarged fragmentary section taken on line 3—3 of Figure 2, showing a detail of one of the ball bearing supports for the sphere;
Figure 4 is an enlarged section taken substantially on line 4—4 of Figure 2, with portions broken away for purposes of clarity; and,
Figure 5 is an enlarged perspective view of the eccentric drive cam and pulley unit of the device.

Referring to the drawing in detail the novel apparatus is indicated generally at 5 and includes a sphere or globe 6 representing the earth and a support stand indicated generally at 7.

The support stand includes an annular ring 8 including circumferentially spaced downwardly opening, internally threaded bosses 9. The bosses 9 receive therein, see Figure 3, threaded ends of support rods or standards 10 which terminate in enlarged supporting feet 11. The ring includes a pair of upwardly opening socket portions 12 which receive therein ball bearings 13, each of which providing a single point contact with the sphere 6 as it is moved in a manner to be subsequently described.

Indicated generally at 14 is a motor drive for imparting movement to the sphere. As seen in Figure 4, the ring 8 has projecting inwardly therefrom one leg portion 15 of a C-shaped frame 16. The leg portion 15 carries a collar 17 which has journalled therein a spherical bearing 18 through which extends the drive shaft 19 of an electric motor 20. The motor 20 is enclosed in a housing 21 which includes a depending stub shaft 22. The leg portion 15 carries a depending portion 23 continuing in a laterally extending leg 24 which in turn carries an annular housing 25, and the housing has journalled therein a circular cam disk 26 having an eccentrically disposed bore 27 which receives the stub shaft 22. The cam disk 26 includes an integral depending extension 28 and a sheave or pulley portion 29. Extending laterally from one side of the portion 23 is a pair of aligned bearings 30 which have journalled therein an auxiliary shaft 31. Secured to the upper and lower ends of the shaft 31 are driven pulleys or sheaves 32 and 33, respectively. The drive shaft 19 has secured thereto, below the bearing 18, a pulley or sheave 34, and an endless belt 35 is entrained over the pulleys 32 and 34. Entrained over the pulleys 29 and 33 is an endless belt 36. Fixed to the upper end of the drive shaft 19 is a friction disk 37 the raised periphery of which will tangentially oppose and engage the sphere 6 and provide a third point of support therefor, as shown in Figures 1, 2 and 4. The disk 37 may be constructed of rubber or other suitable friction material.

*Operation*

As the motor 20 is driven, the shaft 19 and the friction wheel 37 will be rotated, and the pulley 34 will rotate shaft 31 through belt 35 and sheave 32. The cam disk 26 will be rotated by sheave 33, belt 36 and sheave portion 29. As the cam disk 26 is rotated, the stub shaft 22 of the motor housing 21 will be oscillated, or tilted, as will the drive shaft 19, such movement being permitted by the spherical bearing 18. The friction wheel 37 will thus not only be rotated but will wobble in a constantly changing plane. Since the friction wheel is in tangential driving contact with the sphere 6, a compound rotary movement will be imparted to the sphere.

If desired, the drive belts 35 and 36 may be removed from their respective sheaves and the cam disk 26 may be oriented to a selected position manually. Thus an infinite number of planes of rotation may be selected for the sphere depending upon the point of engagement of the driving disk 37. Thus it is possible to manually adjust the plane of rotation of the sphere depending upon the point of contact established by the manual adjustment.

The construction shown embodies the invention in a preferred form, but it is intended that the disclosure be illustrative rather than definitive, the invention being defined in the appended claims.

I claim:
1. In combination a sphere, and a support stand freely supporting said sphere for movement thereon, said support stand having operating means for moving said sphere in a path of movement on said stand about an axis of said sphere, said operating means including a motor having a drive shaft, annular force transmitting means on said drive shaft and in engagement with said sphere, and means mounting said drive shaft for varying the angle thereof with respect to said sphere to vary the line of contact between said sphere and said force transmitting means to in turn vary with axis of rotation of said sphere.

2. In combination a sphere, and a support stand freely supporting said sphere for movement thereon, said support stand having operating means for moving said sphere in a path of movement on said stand about an axis of said sphere, said operating means including a motor having a drive shaft, annular force transmitting means on said drive shaft and in engagement with said sphere, and means mounting said drive shaft for rotation in an oscillatory path of movement to constantly vary the line of contact between said sphere and said force transmitting means to in turn constantly vary the axis of rotation of said sphere.

3. The combination of claim 2 in which said force transmitting means comprises a friction wheel element frictionally engaging and tangentially opposed to said sphere.

4. The combination of claim 3 in which said support stand includes a pair of anti-friction bearing means engageable with said sphere combining with said wheel to provide a three-point support for said sphere.

5. The combination of claim 4 in which the motor drive shaft is mounted in a universal bearing carried by said support stand, a housing enclosing said motor and including a depending stub shaft coaxial with said drive shaft, eccentric drive means engaging said stub shaft for oscillating said motor housing and drive shaft, and power transmitting means operatively connected between said drive shaft and eccentric drive means whereby rotation of said drive shaft imparts oscillatory movement to said drive shaft and said wheel element.

6. In a device of the character described, a sphere, means providing a three point free resting support for the sphere, said support means including a driving wheel presenting a circular friction ring in generally tangential relation to the surface of the sphere and mounted for rotation about an axis bearing generally radial relation to the center of the sphere, means for positioning the wheel for driving contact with the sphere at a selected point only on said ring to determine the line of contact between said sphere and said ring and to establish the axis of rotation of said sphere, and means for imparting sphere moving rotation to said wheel.

7. A device as defined in claim 6 wherein the driving wheel is carried on a tiltably mounted shaft, means being provided for varying the tilt of the shaft for selectively varying the driving contact of the wheel with the sphere and the axis of rotation of said sphere.

8. A device as defined in claim 6 wherein the driving wheel is carried on a tiltably mounted shaft, means being provided for varying the tilt of the shaft for selectively varying the driving contact of the wheel with the sphere and the axis of rotation of said sphere, the tiltable mounting of the shaft comprising a ball and socket support adjacent the wheel, and means remote from the wheel for swinging the shaft about its ball and socket support.

9. In a device of the character described, a sphere, means providing a three point free resting support for the sphere, said support means including a driving wheel presenting a circular friction ring in generally tangential relation to the surface of the sphere and mounted for rotation about an axis bearing generally radial relation to the center of the sphere, means for positioning the wheel for driving contact with the sphere at a selected point only on said ring, means for imparting sphere moving rotation to said wheel, said driving wheel being carried on a tiltably mounted shaft, means being provided for varying the tilt of the shaft for selectively varying the driving contact of the wheel with the sphere, the tiltable mounting of the shaft comprising a ball and socket support adjacent the wheel, and adjustable eccentric means remote from the wheel for swinging the shaft about its ball and socket support.

10. In a device of the character described, a sphere, means providing a three point free resting support for the sphere, said support means including a driving wheel presenting a circular friction ring in generally tangential relation to the surface of the sphere and mounted for rotation about an axis bearing generally radial relation to the center of the sphere, means for positioning the wheel for driving contact with the sphere at a selected point only on said ring, means for imparting sphere moving rotation to said wheel, said driving wheel being carried on a tiltably mounted shaft, means being provided for varying the tilt of the shaft for selectively varying the driving contact of the wheel with the sphere, the tiltable mounting of the shaft comprising a ball and socket support adjacent the wheel, and adjustable eccentric means remote from the wheel for swinging the shaft about its ball and socket support, said rotation imparting means comprising a motor and there also being included motor driven means for continuously varying the position of the adjustable eccentric so as to provide for a continuous changing of the point of driving contact between the driving wheel and the sphere.

11. For use with a sphere, a support stand, an operating means on said support stand comprising drive means including a rotatable drive shaft movable through a constantly moving oscillatory path, said support stand having antifriction means for cooperating with said drive means in providing a three-point support for a sphere said operating means being power operated and including a friction disk on said drive shaft for tangentially opposing and engaging the sphere, and an eccentric drive operatively connected to said drive shaft for reorienting the same about a constantly changing axis of rotation.

12. For use with a sphere, a support stand, an operating means on said support stand comprising drive means including a rotatable drive shaft movable through a constantly moving oscillatory path, said support stand having antifriction means for cooperating with said drive means in providing a three-point support for a sphere said operating means being power operated and including a friction disk on said drive shaft for tangentially opposing and engaging the sphere, and an eccentric means operatively connected to said drive shaft for reorienting the same about a constantly changing axis of rotation, said last named means including pulley and belt connections between said shaft and said eccentric means.

References Cited in the file of this patent

UNITED STATES PATENTS

| | | |
|---|---|---|
| 1,926,279 | Gray | Sept. 12, 1933 |
| 2,256,134 | Bornay | Sept. 16, 1941 |
| 2,289,877 | Dreyer | July 14, 1942 |
| 2,327,384 | Annesley | Aug. 24, 1943 |
| 2,336,436 | Beindorf | Dec. 7, 1943 |
| 2,344,454 | Plotner | Mar. 14, 1944 |
| 2,477,527 | Pierce | July 26, 1949 |
| 2,685,154 | Ballinger | Aug. 3, 1954 |